United States Patent
Boll et al.

(10) Patent No.: US 6,817,626 B2
(45) Date of Patent: Nov. 16, 2004

(54) AIR BAG SYSTEM FOR A PASSENGER CAR

(75) Inventors: Wolf Boll, Weinstadt (DE); Karl-Heinz Baumann, Bondorf (DE)

(73) Assignee: DaimlerChrysler AG, Stuttgart (DE)

( * ) Notice: Subject to any disclaimer, the term of this patent is extended or adjusted under 35 U.S.C. 154(b) by 93 days.

(21) Appl. No.: 10/022,835

(22) Filed: Dec. 20, 2001

(65) Prior Publication Data

US 2002/0125690 A1 Sep. 12, 2002

(30) Foreign Application Priority Data

Dec. 21, 2000 (DE) .......................................... 100 63 766

(51) Int. Cl.⁷ .............................................. B60R 21/22
(52) U.S. Cl. .................... 280/730.1; 280/735; 296/214
(58) Field of Search ............................ 280/729, 730.1, 280/730.2, 734, 743.1, 735, 728.2, 728.3; 296/214

(56) References Cited

U.S. PATENT DOCUMENTS

| | | | | |
|---|---|---|---|---|
| 2,834,606 A | * | 5/1958 | Bertrand | 280/730.1 |
| 3,414,292 A | * | 12/1968 | Oldberg et al. | 280/740 |
| 3,894,750 A | * | 7/1975 | Eckels | 280/730.1 |
| 4,130,298 A | * | 12/1978 | Shaunnessey | 280/730.1 |
| 5,282,646 A | * | 2/1994 | Melvin et al. | 280/729 |
| 5,470,103 A | * | 11/1995 | Vaillancourt et al. | 280/730.1 |
| 5,602,734 A | * | 2/1997 | Kithil | 701/45 |
| 5,884,964 A | * | 3/1999 | Roeper et al. | 296/187.05 |
| 5,922,877 A | * | 7/1999 | Cao | 546/48 |
| 6,073,960 A | * | 6/2000 | Viano et al. | 280/730.1 |
| 6,189,960 B1 | * | 2/2001 | Mumura et al. | 296/212 |
| 6,244,088 B1 | * | 6/2001 | Compton | 72/105 |
| 6,431,586 B1 | * | 8/2002 | Eyrainer et al. | 280/730.1 |

FOREIGN PATENT DOCUMENTS

| | | |
|---|---|---|
| DE | 29611683 | 10/1996 |
| DE | 19547494 | 7/1997 |
| DE | 19834666 | 5/1999 |

* cited by examiner

*Primary Examiner*—Paul N. Dickson
*Assistant Examiner*—Toan C To
(74) *Attorney, Agent, or Firm*—Crowell & Moring LLP (57) ABSTRACT

An air bag system for a passenger car, in particular a convertible, with at least one inflatable air bag is disclosed. To increase the protection of the passengers, the air bag is housed in a roof frame of the car enclosing at the top a windshield of the passenger car. When the air bag is actuated, it unfolds in the opposite direction of travel of the car in such a manner that, after it unfolds, the air bag is located above the head of the driver and/or the passenger.

30 Claims, 5 Drawing Sheets

AIR BAG SYSTEM FOR A PASSENGER CAR

BACKGROUND AND SUMMARY OF THE INVENTION

This application claims the priority of German Patent Document No. 100 63 766.3, filed Dec. 21, 2000, the disclosure of which is hereby incorporated by reference.

The invention relates to an air bag system for a passenger car with at least one inflatable air bag.

Modern passenger cars already include air bag systems, in which an air bag is housed in the steering wheel or on the passenger side in the dashboard, to reduce the risk of injury in the event of a crash. Whereas a conventional air bag damps the frontal impact of the driver's head or the passenger's head, modern motor vehicles also have side air bags, which also damp the side impact of the head or the body. Such side air bags are housed, for example, in the so-called "B pillars" or in the side checks of the backrests.

German Patent Document DE 195 47 494 A1 discloses an air bag system, in which an inflatable, hose-shaped air bag is housed in a channel below the side door shoulder. The rear end of the air bag is connected to an adjusting device, for example in the form of a push rod, which can be moved upwards in the event of impact, and which moves the air bag into a position that prevents the passenger's head from moving to the side, even when there is no roof structure. Thus, in the case of this air bag, the rear holding point that is connected stationarily to the body of the car can be moved at the side door.

German Patent Document DE 296 11 683 U1 discloses an air bag system for a convertible vehicle, where one or more air bags are disposed in the folding roof of the convertible, with the result that the passenger is protected against impact when the folding roof is closed. The actuated air bag extends from an upper exterior of the folding roof toward the bottom such that the result is lateral impact protection for the passenger.

German Patent Document DE 198 34 666 A1 discloses an air bag equipped with two chambers that can unfold quickly at different rates when the air bag is actuated.

If, in the event of a crash, the vehicle rolls over, that is, a so-called rollover occurs, the passengers run the risk of being thrown with their heads against the relatively un-cushioned roof of the vehicle. In a passenger car designed as a convertible, there is, in addition to a so-called rollover, the risk that the passengers will make contact with the road.

The present invention deals with the problem of equipping an air bag system for a passenger car, in particular a convertible, such that the risk of injury during rollover is reduced.

The invention solves this problem, in an embodiment, by means of an air bag system with at least one inflatable air bag where the air bag is housed in a roof frame of the car, the roof frame enclosing a top of a windshield of the passenger car. When the air bag is actuated, it unfolds in a direction opposite the car's direction of travel such that, after it unfolds, the air bag is located above the head of the driver and/or passenger of the car.

The invention is based on the idea of housing at least one air bag in the vehicle such that it unfolds above the driver's head and/or above the passenger's head. According to an embodiment, this air bag is housed in a roof frame, enclosing at the top a windshield of the vehicle. Due to the air bag system of the invention, a passenger also has adequate impact protection in the direction of the roof side of the vehicle even in the event of a rollover. By housing the air bag in the roof frame above the windshield, the air bag can unfold its protective effect, whereby the air bag extends itself in a protective manner between the head and road, even in the case of a convertible with the top folded down. In this case, the unfolding direction of the air bag is toward the rear and toward the top.

In a preferred embodiment there can be provided an air bag control, which is connected to a sensor, detecting a rollover of the passenger car. The air bag control actuates the air bag only when the passenger car rolls over. This measure prevents the air bag, which is housed, according to an embodiment, in the front upper roof frame, from being actuated in the event of an accident, during which it is not required per se.

To the extent that the passenger car is designed as a convertible, an embodiment is preferred in which an air bag control actuates the air bag only when a top, or roof, of the convertible is open. In such an embodiment, the air bag can be configured and dimensioned especially for the case that the top of the convertible is open, when the air bag is used. In particular it is easier to orient the direction, in which the air bag unfolds suddenly, when the top is open so that the driver's head or the passenger's head is not hit by the actuating air bag. Expediently the air bag control is designed in such a manner that it actuates the air bag only when the aforementioned conditions are fulfilled in total, thus for an open top and during rollover.

To avoid a collision between the unfolding air bag and the passenger's head even in the case of a taller passenger, the air bag can unfold, upon actuation, in the opposite direction of travel and upward, according to a preferred design.

In another embodiment, the air bag can extend in essence over the entire width of the interior. The result is that for the driver and for the passenger there is one and the same air bag. At the same time the space above the driver's head and the passenger's head can be filled by the air bag without virtually any gap, thus reducing the risk of injury.

In another embodiment, the air bag can include at least one side wing, which unfolds downwards, upon actuating the air bag, on one side end of the air bag. After unfolding, the air bag is disposed on the side of the driver's or the passenger's head. In this manner, the function of a side air bag can be integrated, at least in the head area, into the air bag which is disposed on the front upper roof frame.

Another feature of the invention is the result of designing in such a manner the inflation means, provided for inflating the air bag during its actuation, that the air bag unfolds more slowly than an air bag housed in the steering wheel. Whereas in the event of a frontal collision or a side collision there is relatively little time to inflate the respective air bag in time before the impact of the head or the body, in the case of a rollover there is considerably more time before the vehicle lands on the roof. In this embodiment, the longer time is used to fill the air bag more slowly. Thus, the risk of injury caused by the filling process is reduced.

In another embodiment the air bag can also be designed in such a manner that, after unfolding, the inflated state is maintained longer, as compared to an air bag housed in a steering wheel. This embodiment is based on the recognition that a vehicle can roll over several times so that the protection, guaranteed by the air bag of the invention, is also maintained for several rollovers. Thus, in this respect, too, the air bag of the invention differs significantly from a conventional frontal air bag or side air bag that unfolds its impact protection only in the event of a single impact.

The air bag system of the invention is especially advantageous when the air bag exhibits several chambers above the head in the vertical direction. Primarily for the case that the air bag of the invention is used in a passenger car, designed as a convertible, this embodiment increases the personal protection, because the damping effect of the air bag is maintained at least to some degree even when an outer chamber is damaged during rollover due to contact with the ground.

So that the chambers fill, on the one hand, as quickly as possible upon actuation and the shape remains, on the other hand, stable when the air bag is unfolded, individual chambers of the air bag can communicate with each other by means of check valves.

Especially for an embodiment that is used in a passenger car designed as a convertible, an upper outer skin of the unfolded air bag can be made of a mechanically robust material. In this manner, the air bag material can also withstand harder collisions with the vehicle roof and in particular the road, with the result that the protective effect is improved.

There is another improvement when in the case of the unfolded air bag, a chamber, facing the driver's or the passenger's head, is designed softer than a chamber disposed further upwards. Thus, the protective function of the air bag can be differentiated even more, so that an area of the air bag facing the passenger interior exhibits greater impact protection for the passengers, whereas an outwardly facing area is designed harder and more robust against ground contact and the like.

According to an embodiment, the roof frame can contain a receiving space, which is intended to house the air bag and is sealed by means of the cover. This cover is mounted on a lower edge of the roof frame so as to pivot about an essentially horizontal swivel axis, running in essence at right angles to the longitudinal direction of the vehicle. The cover exhibits an open position, which is defined by an opening stop and in which the cover forms, upon actuating the air bag, an essentially horizontal bearing surface, which guides the unfolding air bag and supports the unfolded air bag. This measure can guarantee that actuation of the air bag results in optimal kinematics so that an undesired collision of the air bag with the head of the respective passenger can be avoided during the actuating process. Furthermore, in its open position the cover provides for an optimal positioning of the air bag above the respective head even when the air bag is fully unfolded so that this positioning can also be maintained especially in the event of several rollovers.

To avoid the risk of injury due to a malfunction of the air bag, a further feature provides that, for a passenger car designed as a convertible, the cover can be blocked in its closing position by means of the top of the convertible or by a component of the top when the top is closed. The cover can be opened, thus triggering the air bag, only when the top is open.

Other important features and advantages of the device, according to the invention, follow from the claims, the drawings and the related descriptions with reference to the drawings.

It is clear that the aforementioned features and those to be explained below can be used not only in the disclosed combination but also in other combinations or alone without leaving the scope of the present invention.

Preferred embodiments of the invention are depicted in the drawings and are explained in detail in the following description.

DETAILED DESCRIPTION OF THE DRAWINGS

Figure 1:
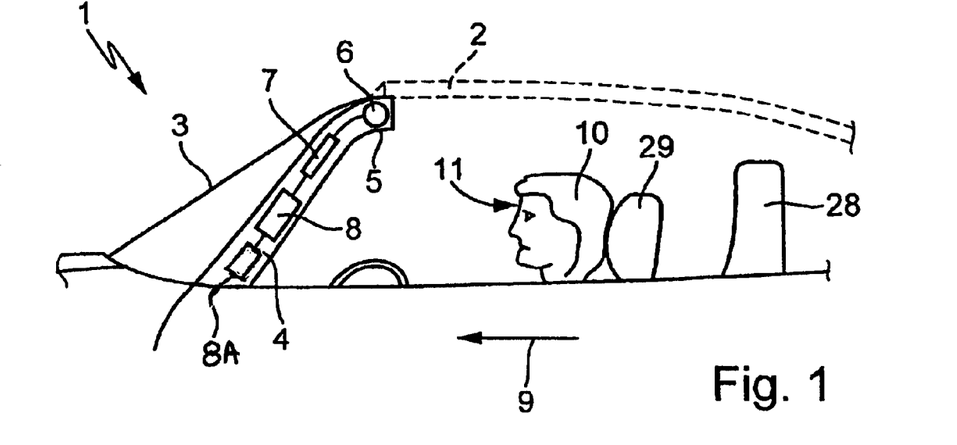
FIG. 1 is a side view of a passenger car equipped with an air bag system of the invention.
Figure 2:
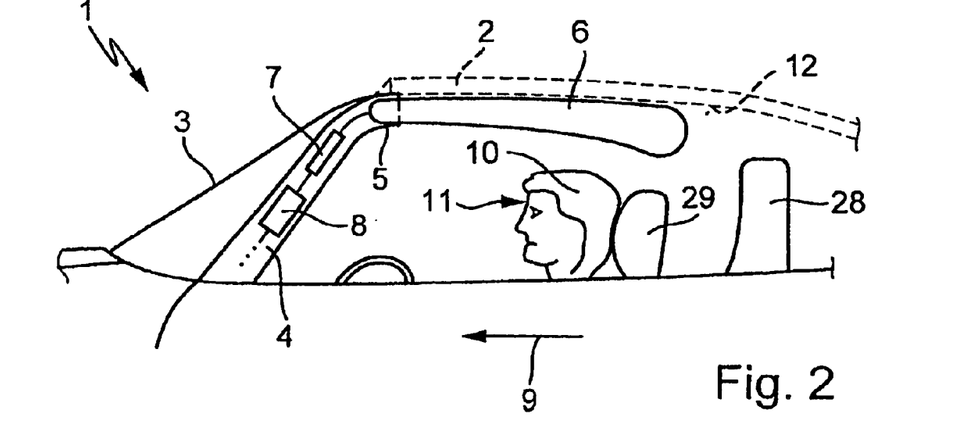
FIG. 2 is a view analogous to that of FIG. 1, but with an actuated air bag in a first embodiment.

FIGS. 1 to 7 depict a detail of a passenger car 1, designed here as a convertible. FIGS. 1 and 2 depict a top 2 of the convertible 1 in its closing position with dashed lines. Even though the present invention is especially advantageous and useful for a passenger car 1 designed as a convertible, it can also be realized in principle in a conventional closed passenger car.

A front pane or windshield 3 of the passenger car 1 is enclosed on the side by so-called A pillars 4 and at the top by a roof frame 5. According to an embodiment of the present invention, this roof frame 5 houses an air bag 6 of the air bag system of the present invention. The air bag system also comprises inflation means 7, for example a gas storage or a pyrotechnic gas generator, serving to quickly inflate the air bag 6. These inflation means 7 are housed preferably in the A pillar 4. Furthermore, the air bag system comprises an air bag control 8, which is also housed here in the A pillar 4. This air bag control 8 communicates with a sensor 8A, which detects the driving states of the passenger car 1, in which it may be necessary to actuate the air bag 6. For example, this sensor detects a rollover of the passenger car 1 and reports it to the air bag control 8. Preferably the air bag control 8 is designed in such a manner that it can actuate the air bag 6 only when there is such a rollover.

To the extent that it involves a passenger car 1 designed as a convertible, as is the case here, the air bag control 8 can actuate in principle the air bag 6 independently of the position of the top 2. Preferred is, however, a design, in which the air bag control 8 actuates the air bag 6 only when the top 2 is open. This feature is practical because it enables the air bag 6 to be dimensioned and designed for the special case that a rollover occurs when the top 2 is open. For the case that a rollover takes place with the top 2 closed, other air bags, which are disposed, for example, in the top 2 and which are not illustrated here, can be actuated. Expediently the inflation means 7 can serve to inflate the air bag 6 when the top 2 is open; and, when the top 2 is closed, they serve to inflate the additional air bags, which are disposed in or at the top 2, but are not illustrated.

FIG. 2 shows an embodiment, in which the air bag 6 can also be actuated when the top 2 is closed or when the passenger car 1 is closed. According to the invention, the air bag system is designed in such a manner that the actuated air bag 6 inflates in the opposite direction of travel 9, symbolized by an arrow, or thus to the rear of the car. Following inflation, the air bag 6 is located, according to FIG. 2, above a head 10 of a driver 11. The result of this positioning of the unfolded air bag 6 is that the driver's head 10 is protected from impact in the upward direction. The air bag system, according to the invention, can also be designed in such a manner that, in addition to or as an alternative, suitable impact protection is also designed for the head of a passenger (not illustrated). This goal can be reached, for example, with two separate air bags 6, which are to be actuated in particular separately. Similarly it is possible to design an embodiment, in which a single air bag 6 is provided for both the driver and for the passenger.

In the embodiment, according to FIG. 2, the unfolded air bag 6 lies flexibly against the ceiling 12 of the top 2 or a roof of a closed passenger car. In this manner the unfolded air bag 6 is braced against the ceiling 12 for the purpose of producing effective impact protection.

Figure 3:
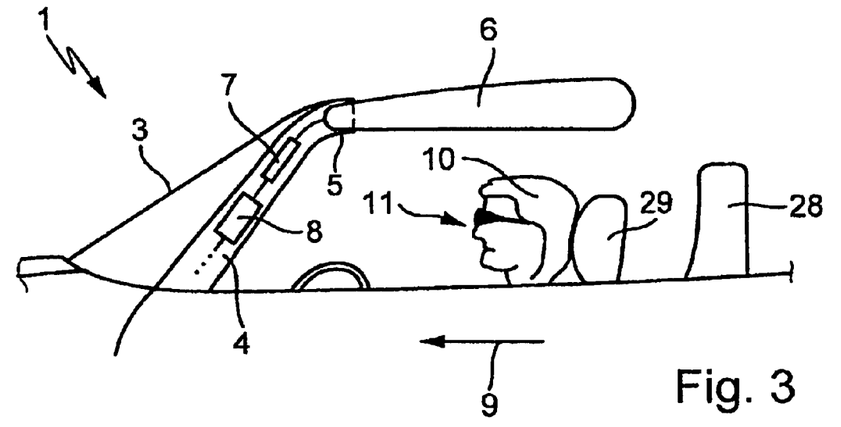
FIG. 3 is a view analogous to that of FIG. 2, but in a second embodiment.

In the embodiment, according to FIG. 3, the air bag control 8 is designed in such a manner that in the event of a crash it actuates the air bag 6 only when the top is open. Correspondingly the direction of actuation or unfolding of the air bag 6 can be adapted to these boundary conditions. In the present embodiment the air bag 6 unfolds, upon actuation, in the opposite direction of travel 9 and more or less also in the upward direction. In this manner it is avoided that in the case of a taller driver 11 the air bag 6 collides with the head 10 as soon as the air bag is actuated.

Figure 4:
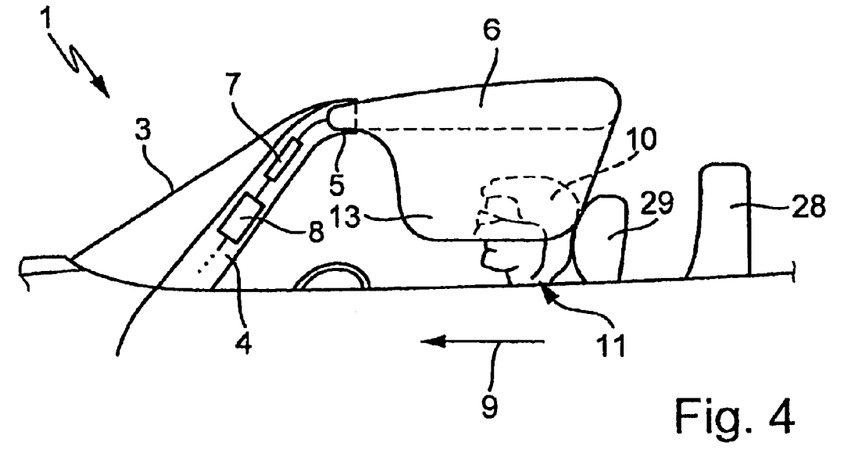
FIG. 4 is a view analogous to that of FIG. 2, but in a third embodiment.

FIG. 4 illustrates another embodiment of the air bag system, in which the air bag 6 exhibits a side wing 13, which unfolds, upon actuation of the air bag 6, in the downward direction, at least on one side bordering a side door of the passenger car 1. After unfolding, as shown in FIG. 4, this side wing 13 is located on the side of the head 10 of the driver 11. The passenger side can also exhibit a corresponding side wing 13. Similarly it is possible to design such a side wing 13 in the center plane of the vehicle 1.

Such a side wing 13 provides for the head 10 of the driver 11 additional side impact protection. To form this side wing 13, the air bag 6 can be equipped, for example, with several chambers, divided into partitions by means of valves, valve flaps, and in particular check valves.

Figure 5:
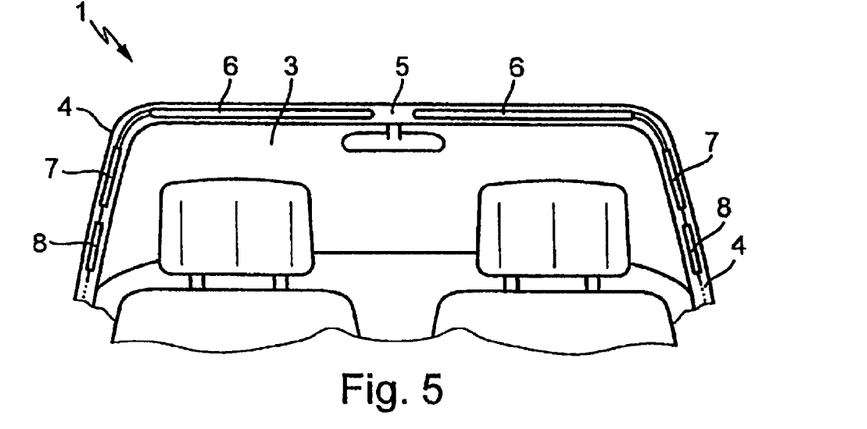
FIG. 5 is a view from the inside of a front passenger area of a passenger car equipped with the air bag system, according to the invention.

According to FIG. 5, the passenger car 1 can be equipped, for example, with two separate air bags 6, one for the driver and one for the passenger. Both air bags 6 are equipped here with their own inflation means 7 and their own air bag control 8. Similarly it is possible to provide a design, wherein at least the air bag control 8 is responsible for both air bags 6. In FIG. 5 the air bags 6 are not actuated and are still located correspondingly in the roof frame 5. As in the case of conventional air bags, the shape of the roof frame 5 is chosen in such a manner that the air bags 6 cannot be detected as such.

Figure 6:
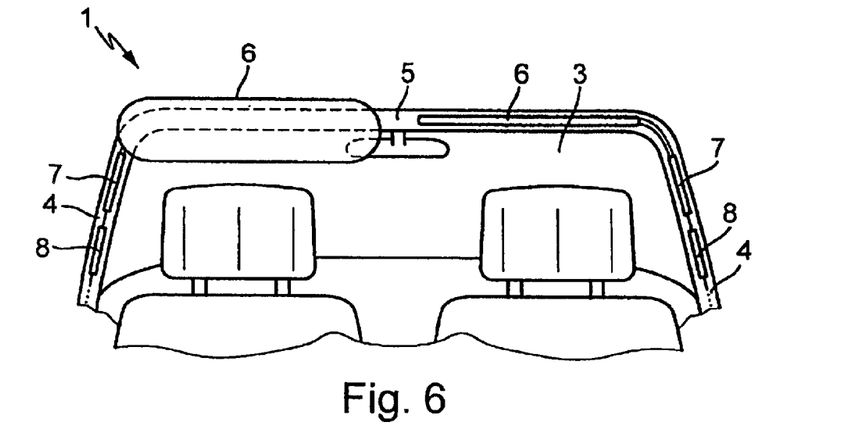
FIG. 6 is a view analogous to that of FIG. 5, but with an actuated air bag.

In FIG. 6 the air bag 6 that is illustrated on the left side is actuated so that in its unfolded state it is located above the respective head. The air bags can be actuated separately, for example, by means of conventional seat load detection. Similarly an individual air bag can be deactuated, for example, manually.

Figure 7:
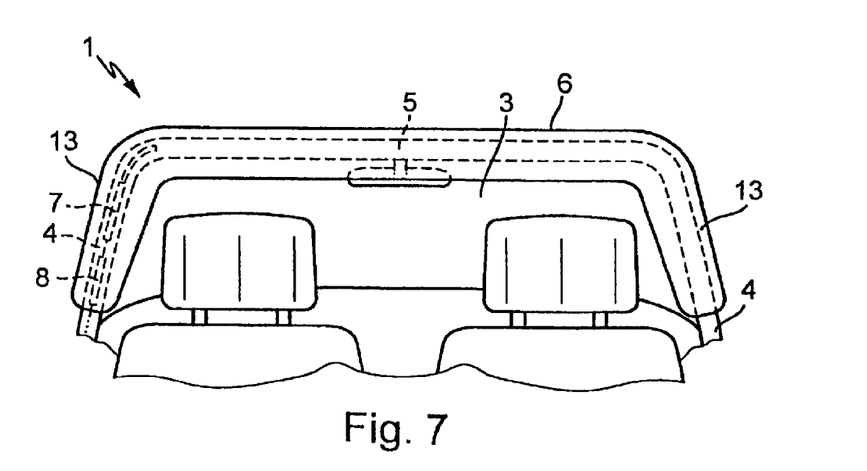
FIG. 7 is a view analogous to that of FIG. 6, but in another embodiment.

In the embodiment according to FIG. 7, a common air bag 6 is provided for the driver's side and the passenger's side. In the unfolded state depicted in FIG. 7, the air bag extends in essence over the entire width of the interior of the passenger car 1. In the embodiment illustrated here each of the two side ends of the air bag 6 has a side wing 13, which has already been shown in FIG. 4. These side wings 13 unfold in the downward direction and are disposed on the side of the driver's head or the passenger's head for the purpose of forming side impact protection.

Figure 8:
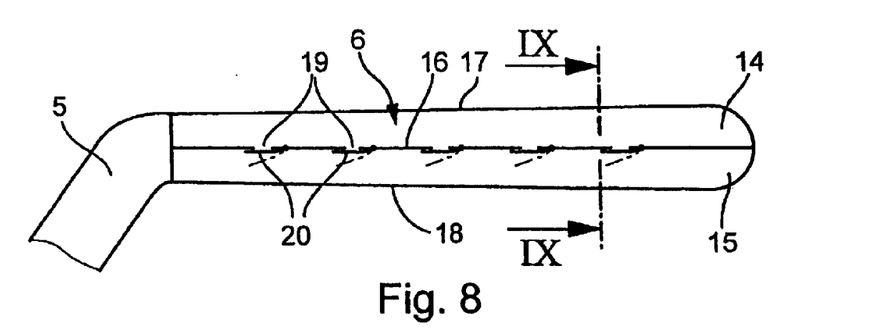
FIG. 8 is a longitudinal view of an air bag of the air bag system, according to the invention.

In at least one area above the driver's head or the passenger's head in the vertical direction, the air bag 6 can exhibit, according to FIG. 8, at least two adjacent chambers 14 and 15, which are separated from each other by a common interface skin 16. Correspondingly, the upper chamber 14 is defined by an outer upper skin 17 and the interface skin 16, whereas the bottom chamber 15 is defined by the interface skin 16 and an inner bottom skin 18. The interface skin 16 can exhibit several openings 19, through which the chambers 14 and 15 can communicate with each other. In the inflated state of the air bag 6, these openings 19 are closed by straps 20, which prevent a return flow from the bottom chamber 15 into the upper chamber 14. According to the drawings illustrated with the dashed lines, the straps 20 are flexible and can lift up from the openings 19, thus enabling flow from the upper chamber 14 into the bottom chamber 15. Thus, these openings 19 form together with the straps 20 check valves, through which there is flow only in essence from the top to the bottom. It is clear that in principle another arrangement of these check valves can also be used. Similarly, other valve means can also be used. For example, when the air bag 6 is actuated, the fill gas is passed directly into the upper chamber 14, from where it flows through the openings 19 also into the bottom chamber 15.

Figure 9:
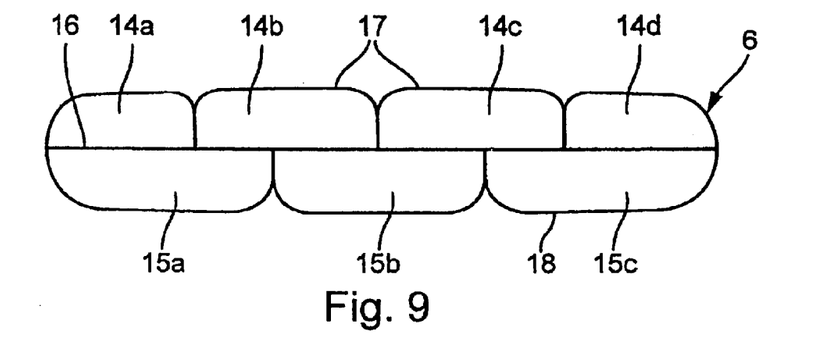
FIG. 9 is a cross sectional view of the air bag, according to FIG. 8, along the intersections IX in FIG. 8.

As is evident from FIG. 9, the air bag 6 can also have several chambers at right angles to the longitudinal direction of the vehicle. Four upper chambers 14a to 14d and three bottom chambers 15a to 15c are depicted here as an illustration. A multi-chamber design of the air bag 6 is advantageous especially for an application, in which the air bag 6 is used in a passenger car 1, designed as a convertible, when the top is open. When the air bag 6 makes contact with the road or any other foundation or optionally rolls over, it is relatively easy for the upper skin 17 of the air bag 6 to be damaged. Then the respective chamber 14 or 14a to 14d leaks and the effectiveness of its impact protection is decreased. The more individual chambers there are, the easier it is to guarantee the protective function of the air bag 6 even when the upper skin 17 is partially damaged.

Figure 10:
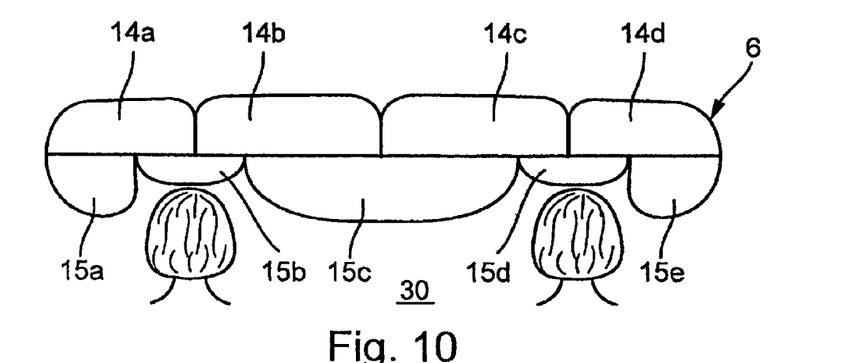
FIG. 10 is a cross sectional view analogous to that of FIG. 9, but in another embodiment.

When the air bag 6 is designed as multiple chambers, there is, according to the embodiment of FIG. 10, in particular the possibility of assigning different functions to the individual chambers by means of their position and geometry. In the embodiment, according to FIG. 10, the air bag 6 has, for example, four upper chambers 14a to 14d and five bottom chambers 15a to 15e. Whereas the upper chambers 14 are designed in essence the same as in the embodiment according to FIG. 9, a special configuration is chosen for the bottom chambers 15. After the air bag 6 has been actuated, the chambers 15a and 15e, which are arranged externally on the side, and the central chamber 15c project definitely deeper into a passenger space 30 than the chambers 15b and 15d, which are arranged between one of the side chambers 15a, 15e and the central chamber 15c. The positioning and dimensioning of the bottom chambers 15a to 15e is selected in such a manner that the chambers 15a and 15e, which lie externally on the side, form the side impact protection for the driver's or the passenger's head. The central chamber 15c forms a central buffer, protecting the driver's head and the passenger's head against a collision. The chambers 15b and 15d, which are arranged between an outer and the central chamber, are positioned in such a manner above the driver's head and the passenger's head that the inflation process does not in itself result in contact between the chamber 15b or 15d and the respectively assigned head. These chambers 15b and 15d, which are assigned to the respective head, serve as the head buffer, where their protective effect is supplemented by the effect of the upper chambers 14. The cross sections of the cushions depicted in FIG. 10 can extend over a relatively large area in the longitudinal direction of the vehicle so that the air bag 6 can unfold the same amount of protective effect, for example, independently of the respective seat position of the driver or the passenger.

Figure 11:
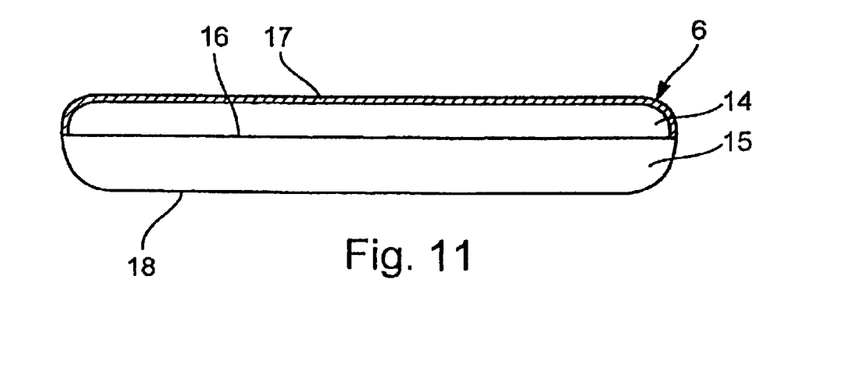
FIG. 11 is a cross sectional view analogous to that of FIG. 9, but in another embodiment.

According to FIG. 11, the upper skin 17 can be made of an especially robust material in a preferred embodiment so that the upper skin 17 also withstands higher mechanical loads. For example, the upper skin 17 can be made of a fiber-reinforced, especially tear-resistant fabric. Similarly, it can be expedient to design also the interface skin 16 with the robust material of the upper skin 17. Moreover, the bottom chamber 15 can be designed softer than the upper chamber 14, thus improving its protective effect in the event of a crash. It can be realized, for example, in that, when the air bag 6 is inflated, a higher pressure prevails in the upper chamber 14 than in the bottom chamber 15. Similarly the bottom skin 18 of the bottom chamber 15 can be made of a material exhibiting a higher flexibility than the robust material of the upper skin 17.

Figure 12:
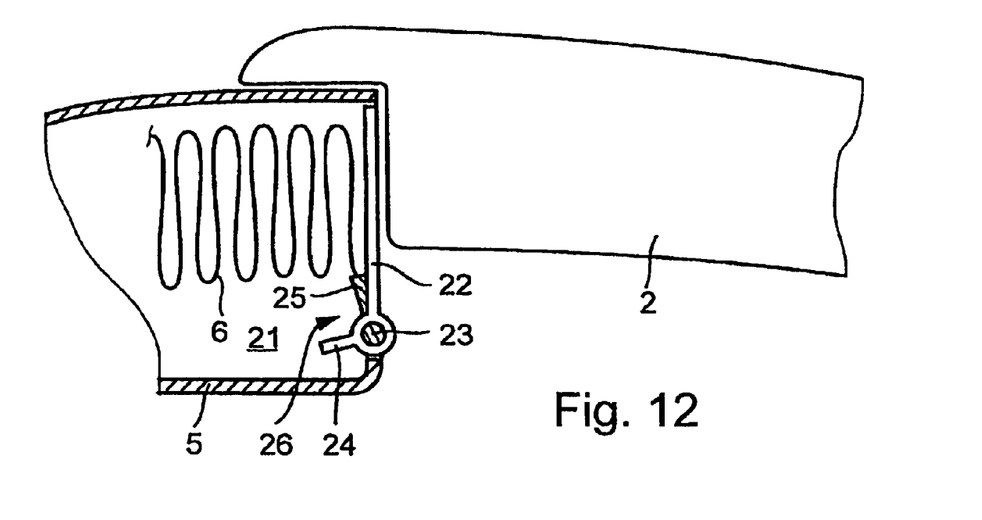
FIG. 12 is a detailed view of a roof frame of a passenger car, equipped with the inventive air bag system, with a deactuated air bag.
Figure 13:
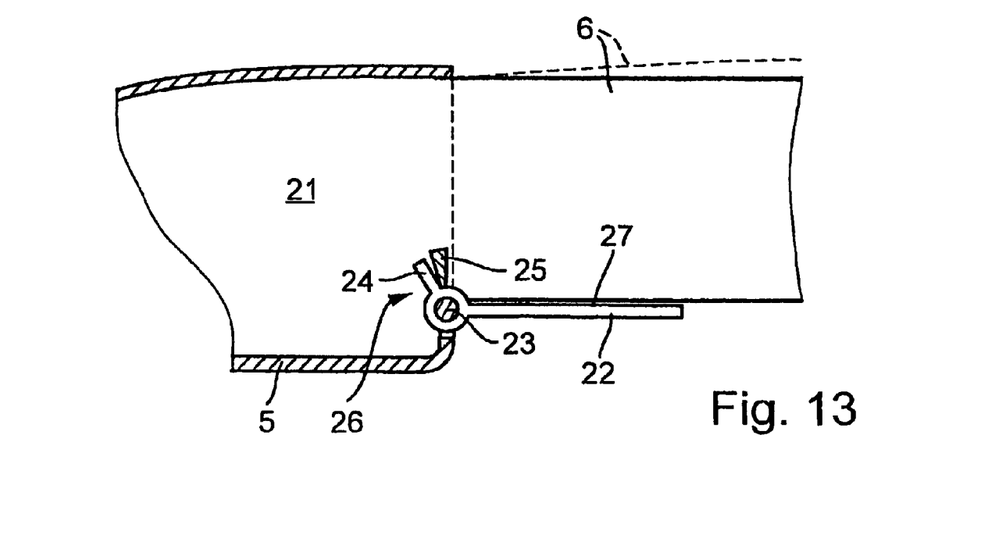
FIG. 13 is a view analogous to that of FIG. 11, but with an actuated air bag.

According to FIGS. 12 and 13, a receiving space 21, whose face side, facing the passenger interior, can be closed with a cover 22, is designed in a preferred embodiment in the roof frame 5 for the purpose of housing the air bag 6. This cover 22 is positioned at the roof frame 5 so as to pivot about a swivel axis 23 at the cover's bottom edge. This swivel axis 23 runs in essence at right angles to the longitudinal direction of the vehicle and in essence horizontally. The cover 22 exhibits a stop arm 24, which, when the cover 22 is opened, interacts with a block 25, which is mounted stationarily on the roof frame 5, for the purpose of forming an opening stop 26. This opening stop 26 defines the swivel adjustment of the cover 22 in the opening direction.

According to FIG. 12, the embodiment depicted is designed in such a manner that the air bag 6, according to the invention, does not function when the top 2 is closed because the top 2 or a component of the top 2 blocks, according to FIG. 12, the cover 22 in its closing position. Therefore, the cover 22 cannot open when the top 2 is closed. It is clear that even the air bag control 8 does not drive the air bag 6 for the purpose of actuation when the top 2 is closed. Yet the illustrated embodiment offers additional protection against an undesired actuation of the air bag 6, for example, in the event of an electronic malfunction of the air bag control 8.

When the top 2 is open, the air bag 6 can then be actuated according to FIG. 13. In so doing, the cover 22 is swiveled into its open position, according to FIG. 13, by means of the unfolding air bag 6. Thus, the opening stop 26 defines an end position for the cover 22, which supports an oriented unfolding of the air bag 6. As it unfolds, the air bag 6 slides with its underside along a bearing surface 27, which is formed by the opened cover 22 and which is aligned in essence horizontally. Correspondingly, the air bag 6 exhibits a horizontally aligned unfolding direction so that the air bag 6 unfolds toward the rear with respect to the direction of travel. In contrast to the variant, depicted in FIG. 13, the opening stop 26 can also be selected in such a manner that the bearing surface 27 tilts more or less toward the top so that the unfolding direction of the air bag 6 also exhibits an upwardly directed component. The fully unfolded air bag 6, indicated here by a dashed line, is braced with its underside against the bearing surface 27, so that the inflated air bag 6 is somewhat positioned. In particular this feature provides that the air bag 6 keeps in essence the spatial position provided for it even during multiple rollovers.

To reduce the risk of injury in actuating the air bag, the air bag system is designed and dimensioned in such a manner according to the invention that the air bag unfolds, in fact, very quickly, in particular suddenly, but that it unfolds relatively slowly compared to a conventional air bag housed, for example, in a steering wheel. Another feature of the air bag system of the present invention is apparent in an embodiment in which the air bag 6 is designed in such a manner that, after it unfolds, the air bag maintains the inflated state for a relatively long period of time compared to a conventional air bag housed for example, in a steering wheel. This feature is advantageous for those accidents, in which the passenger car rolls over several times. For example, the protective function of the inflated air bag 6 is supposed to be guaranteed for about eight seconds.

Thus, in the event of a crash, the air bag 6 offers impact protection for the passenger's head. In addition or as an alternative to the air bag 6 housed in the roof frame 5, another air bag (not illustrated here) can be arranged in or at the rollover bow 28 (see FIGS. 1 to 4) and/or in or at the headrest 29 and/or at the backrest. Additionally, the air bag 6 can be housed in other components of the car so long as the functionality of deploying the actuated air bag over the head of the driver and/or passenger is achieved.

The foregoing disclosure has been set forth merely to illustrate the invention and is not intended to be limiting. Since modifications of the disclosed embodiments incorporating the spirit and substance of the invention may occur to persons skilled in the art, the invention should be constructed to include everything within the scope of the appended claims and equivalents thereof.

What is claimed is:

1. An air bag system for a passenger car comprising at least one inflatable air bag housed in a roof frame of the car at a top of a front windshield of the passenger car, wherein when the air bag is actuated, it unfolds in a direction of travel from a front of the car to a rear of the car such that, after the air bag unfolds, the air bag is located above a head position of a driver and/or a passenger. and an air bag control connected to a sensor. the sensor detecting a rollover of the passenger car wherein the air bag control actuates the air bag only when the passenger car rolls over.

2. The air bag system, as claimed in claim 1, wherein the passenger car is a convertible, and wherein an air bag control actuates the air bag only when a top of the convertible is open.

3. The air bag system, as claimed in claim 1, wherein when actuated, the air bag unfolds in an upward direction.

4. The air bag system, as claimed in claim 1, wherein the unfolded air bag extends substantially over an entire width of an interior of the passenger car.

5. The air bag system, as claimed in claim 1, wherein the air bag includes at least one side wing at a side end of the air bag which unfolds downwards, upon actuating the air bag, such that, after unfolding, the air bag is located on a side of the head position of the driver or the passenger.

6. The air bag system, as claimed in claim 1, wherein an inflation means for inflating the air bag upon its actuation is provided and designed such that the air bag unfolds more slowly than a conventional air bag housed in a steering wheel.

7. The air bag system, as claimed in claim 1, wherein the air bag is designed such that, after unfolding, an inflated state is maintained longer than that of a conventional air bag housed in a steering wheel.

8. The air bag system, as claimed in claim 1, wherein the air bag includes a plurality of chambers above the driver's or the passenger's head position.

9. The air bag system, as claimed in claim 8, wherein individual chambers of the plurality of chambers communicate with each other over check valve means.

10. The air bag system, as claimed in claim 8, wherein a chamber, which is arranged externally on a side with respect to the driver's or the passenger's head position, is designed such that, when the air bag is inflated, the chamber projects deeper into a passenger space than a chamber arranged above the head position of the driver or the passenger.

11. The air bag system, as claimed in claim 8, wherein a chamber, which is arranged in a center of the car with respect to the driver's head or the passenger's head position, is designed such that, when the air bag is inflated, the chamber projects deeper into a passenger space than a chamber arranged above the head position of the driver or the passenger.

12. The air bag system, as claimed in claim 8, wherein the plurality of chambers include vertically adjacent chambers and wherein a vertically adjacent chamber facing the driver's or the passenger's head position, is softer than a vertically adjacent chamber arranged further toward a top of the car when the air bag is inflated.

13. The air bag system, as claimed in claim 1, wherein an outer upper skin of the inflated air bag is made of a mechanically robust material.

14. The air bag system, as claimed in claim 1, wherein the roof frame contains a receiving space which houses the air bag and is sealed by a cover, wherein the cover is mounted on a lower edge of the roof frame so as to pivot about a substantially horizontal swivel axis, running substantially at right angles to a longitudinal direction of the car, wherein the cover has an open position, which is defined by an opening stop, and in which the cover forms, upon actuating the air bag, a substantially horizontal bearing surface which guides the unfolding air bag and supports the unfolded air bag.

15. The air bag system, as claimed in claim 14, wherein when the passenger car is designed as a convertible, the cover is blocked in a closed position by a top of the convertible or by a component of the top when the top is closed.

16. An air bag system for a passenger car comprising at least one inflatable air bag housed in a roof frame of the car, the roof frame enclosing a top of a windshield of the passenger car, wherein when the air bag is actuated, it unfolds in a direction of travel opposite a direction of travel of the car such that, after the air bag unfolds, the air bag is located above a head of a driver and/or a passenger, and wherein the roof frame contains a receiving space which houses the air bag and is sealed by a cover, wherein the cover is mounted on a lower edge of the roof frame so as to pivot about a substantially horizontal swivel axis, running substantially at right angles to a longitudinal direction of the car, and wherein the cover has an open position, which is defined by an opening stop, and in which the cover forms, upon actuating the air bag, a substantially horizontal bearing surface which guides the unfolding air bag and supports the unfolded air bag.

17. The air bag system, as claimed in claim 16, wherein when the passenger car is designed as a convertible, the cover is blocked in a closed position by a top of the convertible or by a component of the top when the top is closed.

18. The air bag system, as claimed in claim 16, further comprising an air bag control connected to a sensor, the sensor detecting a rollover of the passenger car wherein the air bag control actuates the air bag only when the passenger car rolls over.

19. The air bag system, as claimed in claim 16, wherein the passenger car is a convertible, and wherein an air bag control actuates the air bag only when a top of the convertible is open.

20. The air bag system, as claimed in claim 16, wherein when actuated, the air bag unfolds in the opposite direction of travel and in an upward direction.

21. The air bag system, as claimed in claim 16, wherein the unfolded air bag extends substantially over an entire width of an interior of the passenger car.

22. The air bag system, as claimed in claim 16, wherein the air bag includes at least one side wing at a side end of the air bag which unfolds downwards, upon actuating the air bag, such that, after unfolding, the air bag is located on a side of the head position of the driver or the passenger.

23. The air bag system, as claimed in claim 16, wherein an inflation means for inflating the air bag upon its actuation is provided and designed such that the air bag unfolds more slowly than a conventional air bag housed in a steering wheel.

24. The air bag system, as claimed in claim 16, wherein the air bag is designed such that, after unfolding, an inflated state is maintained longer than that of a conventional air bag housed in a steering wheel.

25. The air bag system, as claimed in claim 16, wherein the air bag includes a plurality of chambers above the driver's or the passenger's head position.

26. The air bag system, as claimed in claim 25, wherein individual chambers of the plurality of chambers communicate with each other over check valve means.

27. The air bag system, as claimed in claim 25, wherein a chamber, which is arranged externally on a side with respect to the driver's or the passenger's head position, is designed such that, when the air bag is inflated, the chamber projects deeper into a passenger space than a chamber arranged above the head position of the driver or the passenger.

28. The air bag system, as claimed in claim 25, wherein a chamber, which is arranged in a center of the car with respect to the driver's head or the passenger's head position, is designed such that, when the air bag is inflated, the chamber projects deeper into a passenger space than a chamber arranged above the head position of the driver or the passenger.

29. The air bag system, as claimed in claim 25, wherein the plurality of chambers include vertically adjacent chambers and wherein a vertically adjacent chamber facing the driver's or the passenger's head position, is softer than a vertically adjacent chamber arranged further toward a top of the car when the air bag is inflated.

30. The air bag system, as claimed in claim 16, wherein an outer upper skin of the inflated air bag is made of a mechanically robust material.

* * * * *